United States Patent [19]

Guerreri

[11] Patent Number: 4,779,095

[45] Date of Patent: Oct. 18, 1988

[54] IMAGE CHANGE DETECTION SYSTEM

[75] Inventor: Bart G. Guerreri, Framingham, Mass.

[73] Assignee: H & G Systems, Inc., Carlisle, Mass.

[21] Appl. No.: 923,905

[22] Filed: Oct. 28, 1986

[51] Int. Cl.[4] .............................................. G08G 1/16
[52] U.S. Cl. .................................. 340/904; 340/52 R; 340/901; 180/169; 358/105
[58] Field of Search .................. 358/105, 108; 382/34; 340/901, 903, 904, 52 H, 70, 62, 52 R, 53; 180/169, 271, 279; 250/578

[56] References Cited

U.S. PATENT DOCUMENTS

| | | | |
|---|---|---|---|
| 3,740,466 | 6/1973 | Marshall | 358/105 |
| 3,898,652 | 8/1975 | Rashid | 180/169 X |
| 4,407,388 | 10/1983 | Steel | 340/70 X |
| 4,458,266 | 7/1984 | Mahoney | 358/105 |
| 4,464,789 | 8/1984 | Sternberg | 358/105 X |
| 4,467,313 | 8/1984 | Yoshino et al. | 340/904 |
| 4,590,607 | 5/1986 | Kauth | 358/105 X |

FOREIGN PATENT DOCUMENTS

2131642  6/1984  Fed. Rep. of Germany ...... 340/901

Primary Examiner—Joseph A. Orsino, Jr.
Assistant Examiner—Brian R. Tumm
Attorney, Agent, or Firm—Joseph S. Iandiorio; Douglas E. Denninger

[57] ABSTRACT

An image change detection system for observing an environment to be monitored, such as a region proximate a vehicle, by sensing energy from the region and generating a plurality of pixels which form an image of the region. The system stores a first image of the region and matches pixels of a subsequent image of the region with pixels of the first image to detect deviations between corresponding pixels. The system indicates when the pixel deviations exceed a preselected threshold to detect an abnormal condition in the region. Also a method of monitoring the environment about a vehicle by sensing a first image, sensing a subsequent image, matching the pixels of the subsequent image with the pixels of the first image to detect deviations between corresponding pixels, and indicating when pixel deviations exceed a preselected threshold.

16 Claims, 6 Drawing Sheets

IMAGE CHANGE DETECTION SYSTEM

FIELD OF INVENTION

This invention relates to a system for observing an environment to be monitored such as a region beneath or around a vehicle, e.g. a school bus, and more particularly to such a system which compares a baseline image of the environment to one or more subsequent images to detect differences between them arising from events such as the appearance of a child proximate a wheel of the bus.

BACKGROUND OF INVENTION

Each year a distressingly large number of children are killed by school buses in the United States. The vast majority of these tragic incidents arise not from children running in front of a school bus traveling at normal speeds, but instead arise when the school bus resumes its movement after loading or discharging children. Often the child is killed while reaching under the bus to retrieve an object.

Alerted to these dangers, the drivers of the school buses attempt to maintain constant vigilance around the bus during loading and discharge of passengers. However, even a momentary lapse of observation can result in a fatal injury.

Some attempts have been made to assist the driver in monitoring the environment beneath and around the bus. Most buses are provided with parabolic mirrors designed to provide a broad view of this environment. However, the mirrors are often improperly positioned and, even when in proper position, still require the constant vigilance of the driver in order to be effective.

Automatic monitoring systems must contend with a constantly changing environment beneath a vehicle or in a building. Considerations for monitoring a bus include the presence of curbs at a bus stop, rocks or puddles which are situated haphazardly, and leaves which may blow past. An effective monitoring system must contend with the specific environment at each bus stop. Further, it is desirable for the monitoring system to detect objects potentially pursued by children such as balls or apples.

Other security applications dealing with a changing environment include prevention of tampering with aircraft which, when at rest, are often positioned over or near hoses, service vehicles, or other objects. In yet another application, the rearrangement of objects during the day in buildings such as warehouses produces a different physical topography each night. An intruder remaining stationary during a scan by conventional security systems may not be distinguishable from the objects to be protected.

SUMMARY OF INVENTION

It is therefore an object of this invention to provide an image change detection system which automatically monitors a region of a changeable environment.

It is a further object of this invention to provide such a system which monitors the environment beneath and/or around a vehicle.

It is a further object of this invention to provide such a system which does not rely on the attentiveness of the driver or other personnel.

A still further object of this invention is to provide an image change detection system for use with a motor vehicle such as a school bus.

It is a further object of this invention to provide such a system which adapts to the specific environment at each bus stop.

Yet another object of this invention is to provide a system which can detect objects potentially pursued by children.

A further object of this invention is to provide such a system which can automatically disable the vehicle.

The invention results from the realization that a truly effective system for detecting actual alterations in a region to be monitored while avoiding false alarm indications can be achieved by sensing energy from the region to generate a number of pixels which form an image of the region, and comparing a subsequent image of the region with a first image to detect deviations between corresponding pixels in the two images which exceed a preselected threshold.

This invention features an image change detection system for monitoring the environment about a vehicle. There are means for sensing energy from a region proximate the vehicle and for generating a plurality of pixels which form an image of the region. Each pixel represents the energy received from a portion of the region. The system further includes memory means for storing a first image of the region from the means for sensing and comparison means for matching pixels of a subsequent image of the region with pixels of the first image to detect deviations between corresponding pixels. There is also means responsive to the comparison means, for indicating when the pixel deviations exceed a preselected threshold to detect an abnormal condition in the region.

In one embodiment, the means for sensing includes a plurality of sensors arranged to detect radiation from a region proximate at least one wheel of the vehicle. Each sensor defines a single pixel of the region. The vehicle may be a motor vehicle and the means for sensing further includes lens means for expanding the field of view of the sensors about the curb side of the vehicle. The sensors may include a photodiode array and detect radiation selected from wavelengths between ultraviolet and infrared. The means for indicating includes means for determining when a preselected number of adjacent corresponding pixels deviate to detect the abnormal condition. The means for indicating may include alarm means such as for alerting a human observer.

In another embodiment, the means for indicating includes means for disabling the vehicle such as ignition cut-off means or means for engaging the brakes of the vehicle. The system may further include means for emitting energy toward the region which is detectable by the means for sensing and may further include initiation means for enabling the means for sensing to produce the first image. The system may further include switch means, responsive to the operation of a door of the vehicle, for enabling the means for sensing when the door is opened or closed.

In yet another embodiment, the system further includes activation means for enabling the means for sensing to produce subsequent images after the first image is made. The activation means may include clock means for periodically enabling the means for sensing or tachometer means for enabling the means for sensing to produce a subsequent image when an increase in engine speed occurs in the vehicle.

This invention also features an image change detection system including means for sensing energy from a region to be monitored and generating a plurality of pixels which form an image of the region, memory means for storing a first image of the region, and comparison means for matching pixels of a subsequent image of the region with pixels of the first image to detect deviations between corresponding pixels. There is also means for indicating when the pixel deviations exceed a preselected threshold to detect an alarm condition for the region.

This invention further features a method of monitoring the environment about a vehicle including sensing a first image from a region proximate the vehicle and generating a plurality of pixels to form the image, subsequently sensing a subsequent image from the region, and matching the pixels of the subsequent image with pixels of the first image to detect deviations between corresponding pixels. The method further includes indicating when a number of corresponding pixels deviate to form a pattern meeting or exceeding a preselected arrangement to detect an abnormal condition in the region.

BRIEF DESCRIPTION OF THE DRAWINGS

Other objects, features and advantages will occur from the following description of a preferred embodiment and the accompanying drawings, in which.

DISCLOSURE OF PREFERRED EMBODIMENT

This invention may be accomplished by a detection system which senses energy from a region to be monitored and generates a number of pixels which form an image of the region. The system compares one or more subsequent images of the region with a first image to detect, between corresponding pixels in the two images, deviations which exceed a preselected threshold.

In one construction, the detection system is for use with a motor vehicle which detects changes in images of at least one region, e.g. near one or more wheels of the vehicle. Images formed by a sensor or array of sensors can be one-dimensional, that is, a single row of pixels, or two-dimensional with columns and rows of pixels. In either case, it is preferable for the sensors to be arranged such that the field of view of the sensors establishes a protective "curtain" about the vehicle to be monitored, particularly on the curb side of the vehicle. Alternatively, a single sensor sweeps its field of view along the region to generate each image.

Figure 1:
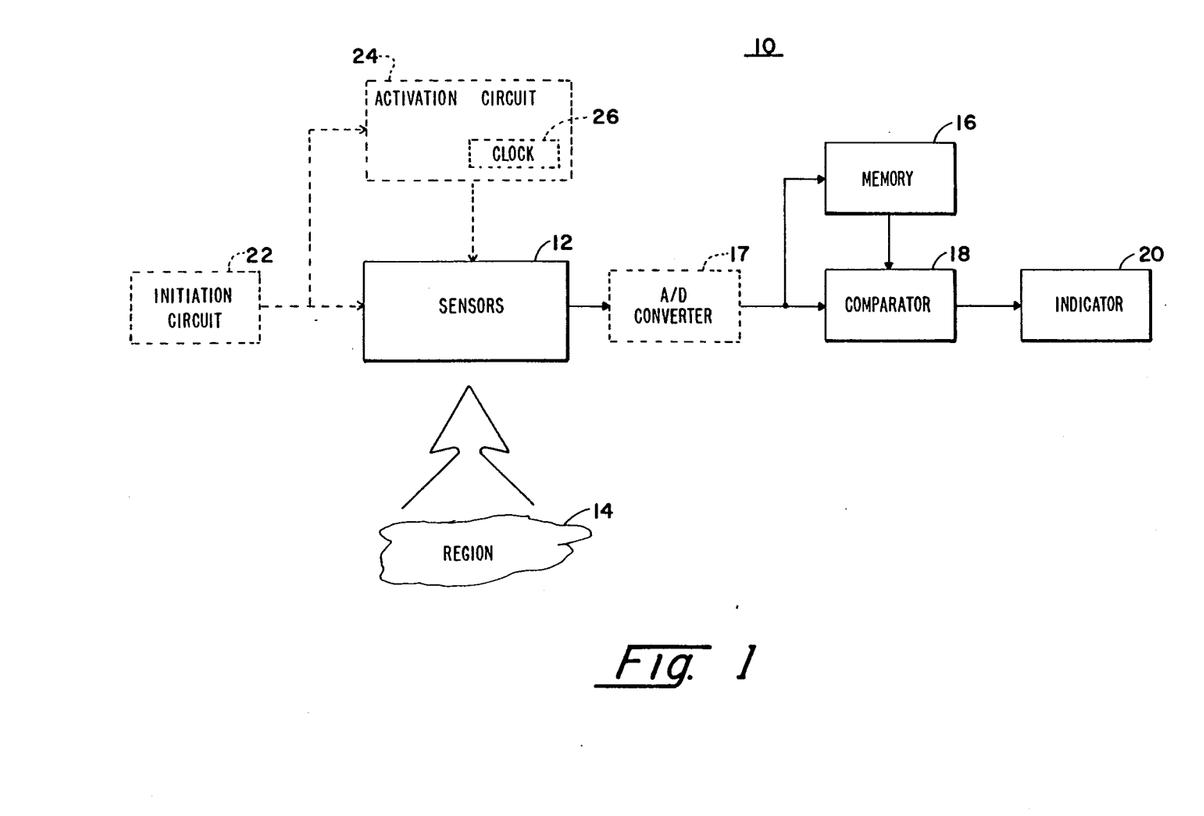
FIG. 1 is a schematic block diagram of an image change detection system according to this invention.

Image change detection system 10, FIG. 1, includes sensors 12 which receive energy such as infrared radiation from region 14 and provide the first image of region 14 to memory 16. System 10 includes A/D converter 17, shown in phantom, when sensors 12 provide analog signals which are to be processed digitally. Subsequent images generated by sensors 12 are provided to comparator 18 which compares the subsequent images with the first image supplied by memory 16. Corresponding pixels between the first image and the subsequent image are compared to detect deviations between them. The first image serves as a baseline image from which the subsequent image is subtracted or otherwise compared or matched. Deviations between images are provided to indicator 20 which determines when a number of corresponding pixels deviate to form a pattern meeting or exceeding a preselected arrangement such as a deviation of two or more adjacent pixels. When the pattern of deviating pixels meets or exceeds the preselected arrangement, indicator 20 provides an alarm such as a flashing light or a buzzer. As described below, detection systems according to this invention can disable the vehicle to arrest its movement.

Image change detection 10 may also include initiation circuit 22 which enables sensors 12 to provide the first image to memory 16 upon the occurrence of a predetermined event such as the opening of a door of the vehicle or when the vehicle comes to a stop. When activation circuit 24 is provided, also shown in phantom, initiation circuit 22 indicates to it when sensors 12 are enabled to provide the first image so that activation circuit 24 can enable sensors 12 to provide subsequent images during events such as the closing of a door or at one- or two-second intervals as determined by clock 26.

Figure 2A:
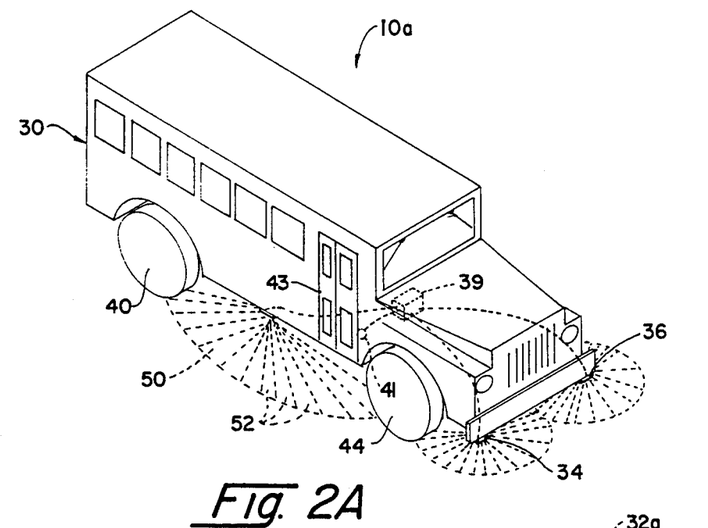
FIG. 2A is a schematic axonometric view of a school bus provided with another image change detection system according to this invention having sensors which view a number of areas beneath the bus.

Image change detection system 10a, FIG. 2A, is disposed in school bus 30. Sensor arrays 32, 34, 36 and 38 (not shown) are mounted under the chassis of bus 30. Detection circuit 39, shown in phantom, contains memory, comparator and indicator circuits responsive to sensor arrays 32, 34, 36 and 38. Door switch 41 detects when door 43 is opened or closed, that is, when door 43 moves or its action mechanism is operated, to enable sensors 32, 34, 36 and 38 to produce a first image or a subsequent image, respectively.

Figures 2B, 4A, 4B:
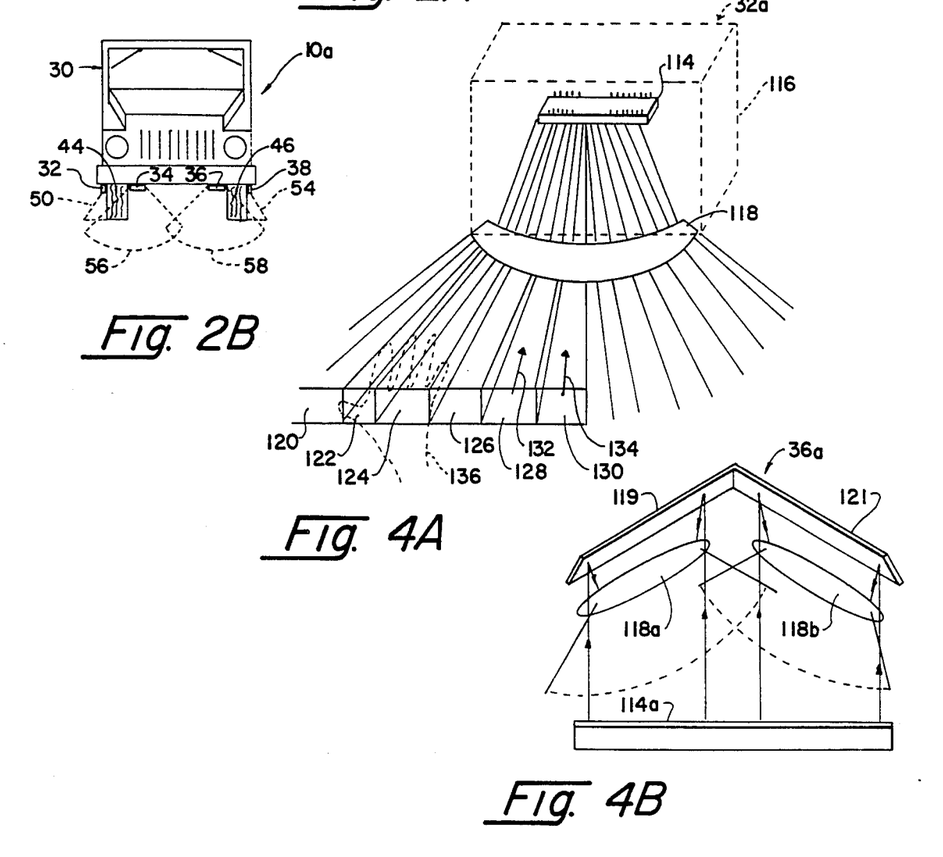
FIG. 2B is a front view of the bus of FIG. 2A showing the curtain of viewing coverage.
FIG. 4A is a schematic enlarged view of one of the sensors of FIG. 2A viewing a number of adjacent areas.
FIG. 4B is a schematic axonometric view of another sensor array shown in FIG. 2A.

Sensor arrays 32, 38 have fields of view directed between curb-side wheels 40, 44 and driver's side wheels 46, 48 (not shown), respectively. Field of view 50 of sensor array 32 is formed of a number of viewing areas 52, each of which forms a pixel of information as described below. Field of view 54 of sensor array 38 and fields of view 56, 58 of sensor arrays 34, 36 are shown in FIG. 2B providing a curtain of surveillance about bus 30. Sensor arrays 34, 36 are positioned such that fields of view 56, 58 cover a region from just in front of wheels 44, 46 diverging forwardly to overlap beneath the front center of bus 30.

Figure 3A:
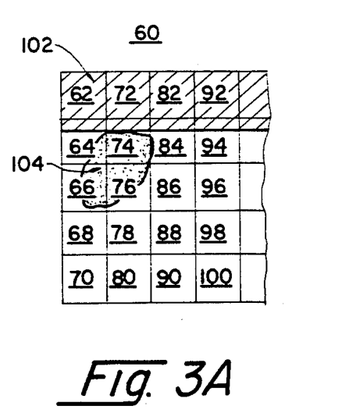
FIG. 3A is a schematic top plan partial view of a region beneath the bus of FIG. 2A as represented by a number of pixels.

First image 60, FIG. 3A, is a two-dimensional image formed of labelled pixels 62, 64 ... 100 arranged in rows beginning with pixels 62, 64, 66, 68 and 70 and columns indicated by pixels 62, 72, 82, 92; additional columns are not shown. Pixels 62 ... 100 are shown as contiguous and in parallel rows and columns but this is not a limitation of the invention. Each pixel represents the energy received from a portion of the region being monitored and can be generated by a single sensor such as described below in relation to FIG. 4, or can be a group of picture elements treated as a single unit.

Figure 3B:
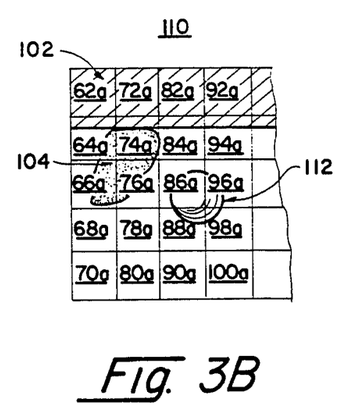
FIG. 3B shows a subsequent image of the region of FIG. 3A with a new object present.

Several objects appear in first image 60. Curb 102 occupies the row beginning with pixel 62 and a portion of the row beginning with pixel 64. Rock 104 lies within pixels 64, 66, 74, 76, and 84. Subsequent image 110, FIG. 3B, includes curb 102 and rock 104 and in addition includes ball 112 which occupies pixels 86a, 88a, 96a and 98a. When subsequent image 110 is matched to first image 60, pixels 86a, 88a, 96a and 98a, FIG. 3B, are detected as deviating from the corresponding pixels of first image 60, FIG. 3A. The size of the pixels are established such that the smallest object to be detected occupies at least two pixels.

Detection of pixel deviation is accomplished according to the type of sensor employed. Sensor array 32a, FIG. 4A, utilizes diode array 114 such as a monolithic photodiode array available from EG&G Reticon, Sunnyvale, Calif. Diode array 114, disposed within housing 116, has one hundred twenty-eight sensing elements whose fields of view are distributed by lens 118 to survey areas 120, 122, 124, 126, 128, 130 and additional areas up to a maximum of 128 total areas. Each utilized sensing element generates one pixel. The sensors from EG&G Reticon are responsive to wavelengths of radiation from near ultraviolet to near infrared.

The field of view of each sensing element of diode array 114 is determined by lens 118. A deviation between corresponding pixels is detected when incoming radiation, shown by arrows 132, 134 emanating from areas 128, 130, respectively, and received by sensing elements of diode array 114, differ by a predetermined amount. The presence of a foreign object such as a child's body causes a change in the measured radiation. Against a cool background, an increase in radiation is measured when a warmer object enters the field of view. A decrease in radiation is detected when a cooler object blocks a hotter background such as sun-warmed pavement. Such a change in infrared radiation can be produced by a child, such as shown in phantom by hand 136, or by an object which the child has handled such as a ball or an apple. In alternate constructions, other energy such as acoustic waves can be monitored by appropriate transducers serving as the sensors.

Sensor array 36a, FIG. 4B, establishes a right-angle curtain of surveillance using lens 118a and 118b positioned at right angles to each other. Mirrors 119, 121 direct the focused light to linear detector array 114a. Other radiation guides such as fiber optics can be utilized.

Figure 5:
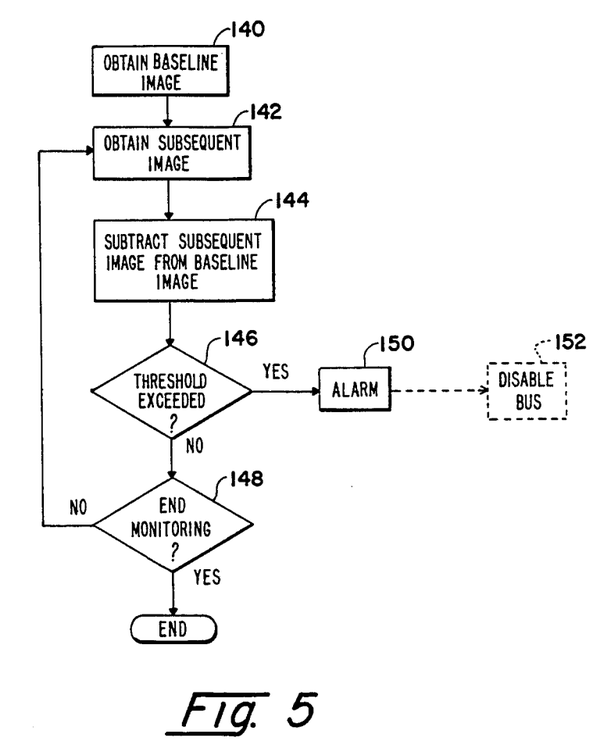
FIG. 5 is a flow chart of the operation of the detection system of FIG. 2A.

The operation of image change detection system 10a is shown in FIG. 5. The baseline image is obtained, step 140, when door switch 41 senses that door 43 is opened. A subsequent image is then obtained, step 142, for example when door 43 is closed, and the images are matched to subtract the subsequent image from the baseline image, step 144. Each pixel in the original and subsequent images is indexed to account for its spatial location relative to other pixels. The subtraction process involves subtracting each subsequent pixel at index i from the corresponding original pixel.

To accommodate a uniform change in background, such as the cooling of the background when shaded by the bus for a long period of time, the subsequent image can be normalized so that the average intensity of the subsequent image matches that of the original image. Further, the pixels can be filtered digitally. In one construction, each subsequent image pixel before subtraction is summed with a fraction of adjacent pixels in each direction and a lesser fraction of the next adjacent pixels.

The number and arrangement of deviating pixels is examined to determine if a preselected threshold is exceeded, step 146, such as two or more adjacent cells for a one-dimensional image or a block of 4 or more pixels in a two-dimensional image. Alternatively, a threshold can be set for the total number of allowable deviating pixels.

If the threshold is not exceeded, operation returns to step 142 to await production of another image to be compared with the baseline image unless the monitoring procedure is halted. When the threshold is exceeded, the alarm condition is indicated by producing an alarm, step 150, which may further include disabling the bus, step 152, shown in phantom.

Figure 6:
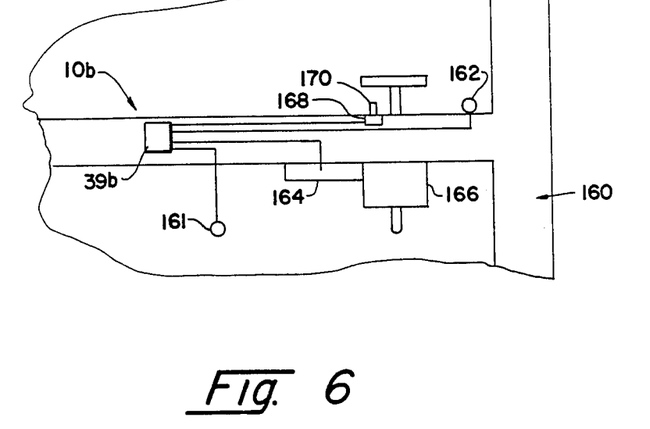
FIG. 6 is a schematic top partial view of a bus equipped with a tachometer sensor for detecting increase in engine rpm and a device for engaging the brakes of the bus and disabling the ignition to arrest travel.

Image detection system 10b, FIG. 6, includes several devices for disabling vehicle 160 in which it is installed. Detection circuit 39b monitors tachometer sensor 161 after a first image is produced and obtains a subsequent image from the sensor arrays (not shown) when the engine speed exceeds several hundred rpm above idle speed. If corresponding pixels deviate in a preselected arrangement, warning light 162 is illuminated and hydraulic actuator 164 is activated to engage master cylinder 166 to lock the brakes of vehicle 160. Alternatively, ignition cutoff switch 168 is activated to disable ignition 170. In one construction, cut-off switch 168 includes a relay, such as Model W67RESX-2 available from Magnecraft, which when activated interrupts the ignition circuit. A timer maintains the open circuit for a preselected period of time, e.g., 15 seconds, after which the motor can be restarted. Upon restart, the system again obtains a subsequent image and compares it to the original image retained in memory. The motor is again disabled if the new subsequent image differs sufficiently from the original image.

Figure 7:
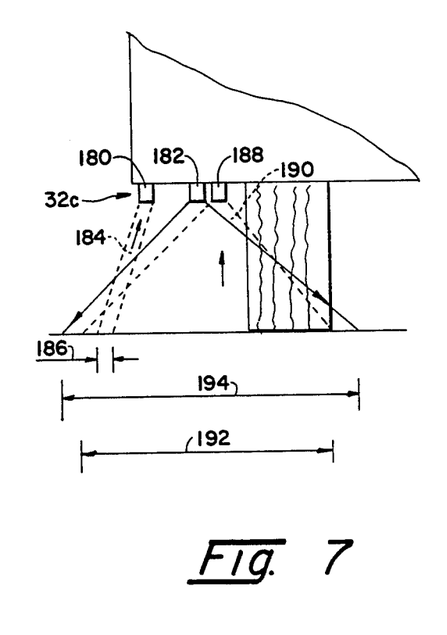
FIG. 7 is a schematic front partial view of a vehicle equipped with a number of sensors each for receiving a different type of radiation.

An image detection system according to this invention can monitor more than one type of energy. Sensor arrays 32c, FIG. 7, include infrared sensor array 180 and light source 182, such as a flash tube, for producing visible light. Infrared sensor 180 has field of view 184 having a width indicated by arrows 186 while sensor 188 has a field of view 190 with a width indicated by arrow 192 which is overlapped by the visible light produced by source 182 having coverage shown by arrow 194.

Figure 8:
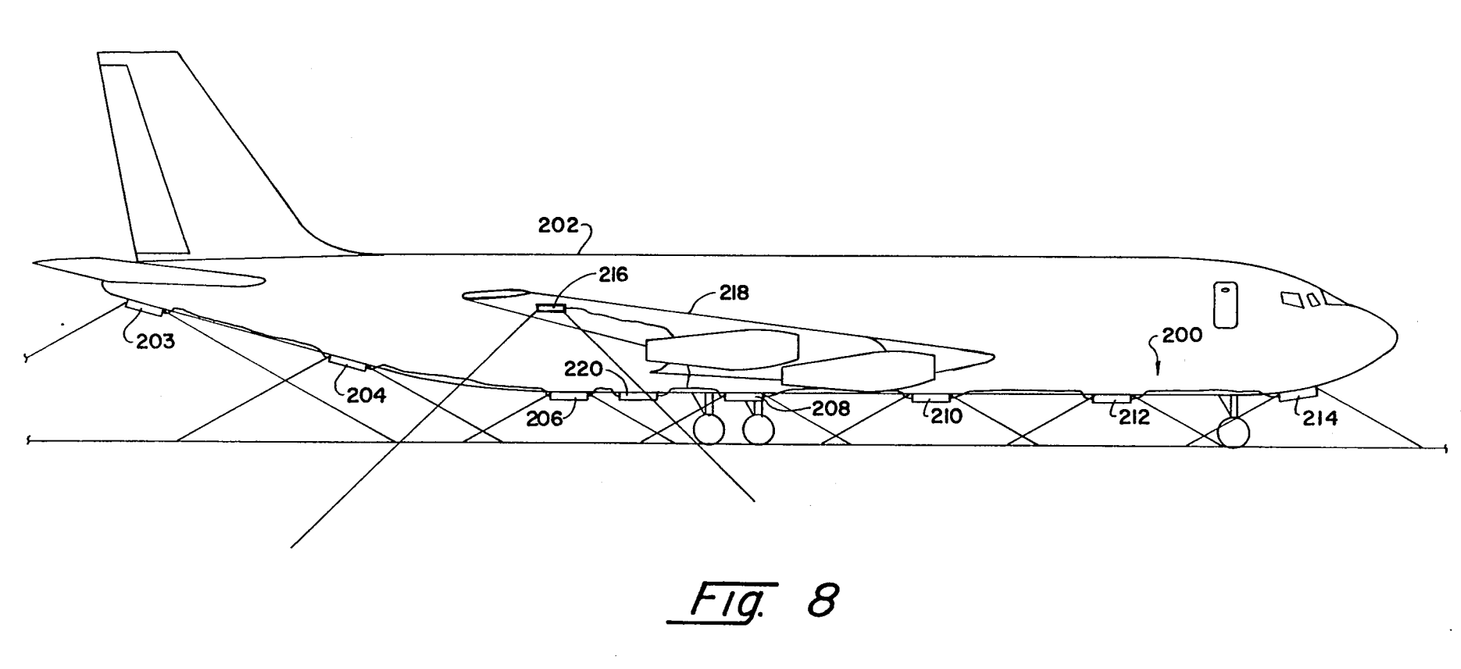
FIG. 8 is a schematic side elevational view of an aircraft provided with an image change detection system according to this invention.

Further, an image detection system according to this invention can be utilized with a vehicle other than a motor vehicle. Image detection system 200, FIG. 8, is shown associated with aircraft 202. Image detection 200 includes sensor arrays 203, 204, 206, 208, 210, 212 and 214 mounted on the underside of aircraft 202, and sensor array 216 mounted beneath wing 218. Detection circuit 220 is mounted on the underside of aircraft 202 and is connected through cables to sensor arrays 203, 204, . . . 216. In another construction, each sensor array includes its own detection circuit. When an image change is detected as described above, a conventional RF transmitter (not shown) relays the alarm condition to a central station.

Figure 9:
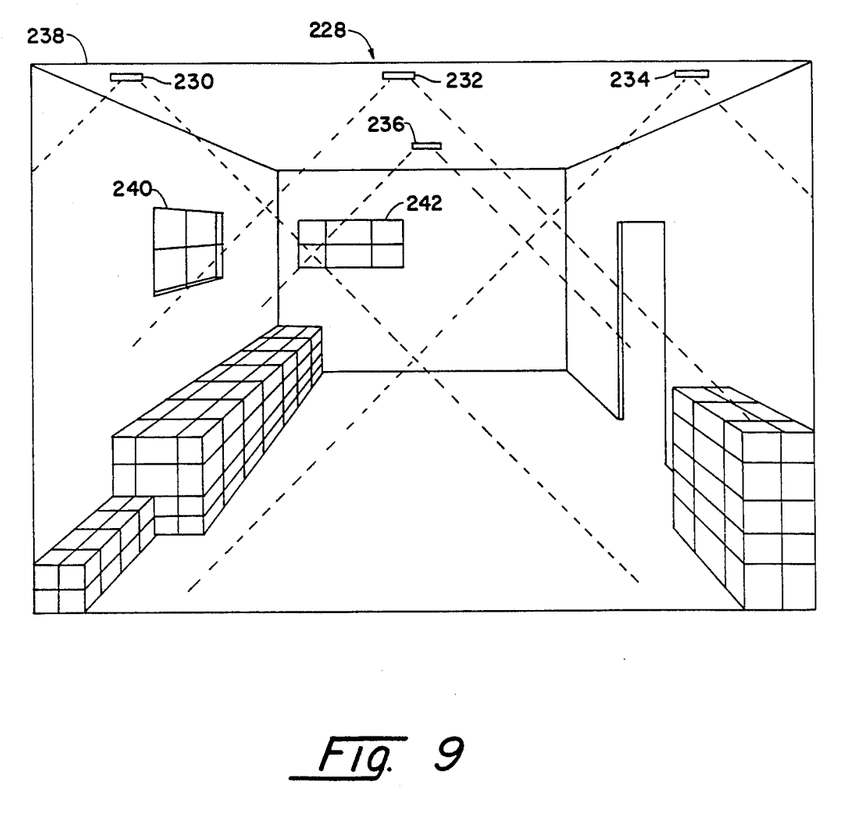
FIG. 9 is a schematic axonometric view of a warehouse protected by an image change detection system according to this invention.

Image change detection system 200 provides security against tampering or entry of aircraft 202. An aircraft or other vehicle can be protected within a hangar or other building by mounting image change detection systems according to this invention with the fields of view of the sensor arrays directed about the vehicle. In addition to monitoring vehicles, an image change detection system according to this invention is suited for monitoring a warehouse where boxes and other objects are rearranged each day. Image change detection system 228, FIG. 9, utilizes sensors 230, 232, 234 and 236 suspended from the ceiling of building 238 to monitor its contents. Sensor arrays 230, 232 are arranged to scan windows 240, 242, respectively. Even though the contents of building 238 may be rearranged each day, the first image generated by sensor arrays 230, 232, 234, 236 establishes the actual physical topography as the base condition and provides an alarm only if an additional alteration in the environment occurs.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An image change detection system for use with a vehicle to be monitored, comprising:
    means for sensing energy from a region proximate the vehicle and for generating a plurality of pixels which form an image of said region, each pixel representative of the energy received from a portion of said region;
    memory means for storing a first image of said region from said means for sensing;
    comparison means for matching pixels of a subsequent image of said region with pixels of said first image to detect deviations between corresponding pixels in the two images;
    means, responsive to said comparison means, for indicating when the pixel deviations exceed a preselected threshold to detect an abnormal condition in said region; and
    switch means, responsive to operation of a door of the vehicle, for enabling said means for sensing when the door is opened or closed.

2. The system of claim 1 in which said means for sensing includes a plurality of sensors arranged to detect radiation from a region proximate at least one wheel of the vehicle.

3. The system of claim 2 in which each said sensor defines a single pixel of said region.

4. The system of claim 2 in which the vehicle is a motor vehicle and said means for sensing further includes lens means for expanding the field of view of said sensors about the curb side of the vehicle.

5. The system of claim 4 in which said sensors include a photodiode array.

6. The system of claim 2 in which said sensors detect radiation selected from wavelengths between ultraviolet and infrared.

7. The system of claim 1 in which said means for indicating includes means for determining when a preselected number of adjacent corresponding pixels deviate to detect the abnormal condition.

8. The system of claim 1 in which said means for indicating includes alarm means.

9. The system of claim 1 in which said means for indicating includes means for disabling the vehicle.

10. The system of claim 9 in which said means for disabling includes ignition cut-off means.

11. The system of claim 9 in which said means for disabling includes means for engaging the brakes of the vehicle.

12. The system of claim 1 further including means for emitting energy toward said region which is detectable by said means for sensing.

13. The system of claim 1 further including initiation means for enabling said means for sensing to produce said first image.

14. The system of claim 1 further including activation means for enabling said means for sensing to produce subsequent images after said first image is made.

15. The system of claim 14 in which said activation means includes tachometer means for enabling said means for sensing to produce a subsequent image when an increase in engine speed occurs in the vehicle.

16. The system of claim 14 in which said activation means includes clock means for periodically enabling said means for sensing.

* * * * *